(No Model.)

D. M. SMALL.
Cooking Apparatus.

No. 228,482. Patented June 8, 1880.

WITNESSES,

Geo. H. Remington.
Joseph H. Perkins

INVENTOR.

Dexter M. Small

UNITED STATES PATENT OFFICE.

DEXTER M. SMALL, OF PROVIDENCE, RHODE ISLAND.

COOKING APPARATUS.

SPECIFICATION forming part of Letters Patent No. 228,482, dated June 8, 1880.

Application filed March 5, 1880. (No model.)

*To all whom it may concern:*

Be it known that I, DEXTER M. SMALL, of Providence, in the State of Rhode Island, have invented a new and useful Improvement in Cooking Apparatus, for carrying off the smoke and steam arising therefrom in cooking, of which the following is a specification.

Figure 1:
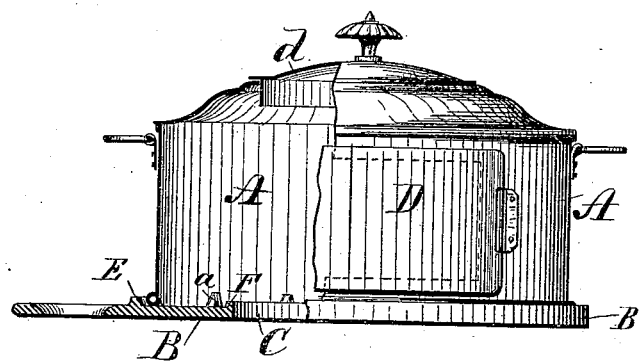
Figure 2:
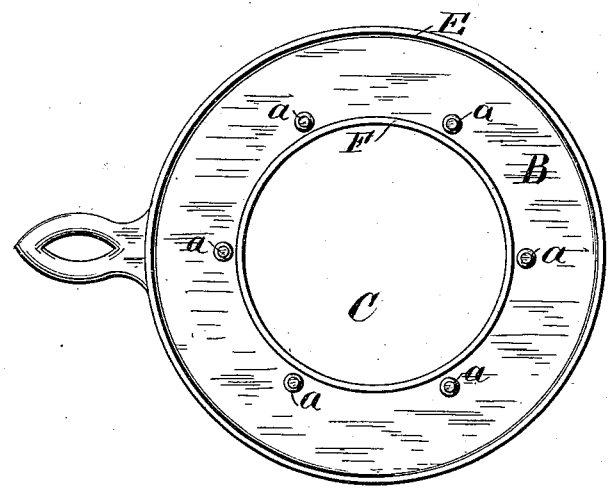

Figure 1 of the accompanying drawings, which form a part of this specification, is a general front view of the apparatus, broken open to show the interior, within which the kettle or spider sits, when in use, upon the elevations $a$, one-quarter of an inch or so high, also seen in Fig. 2, on what I term the "movable bottom" of the apparatus. This bottom B has a hole, C, through it, as represented, which corresponds to the hole in the stove over which it is to be used, and may be in the center or at one side, to correspond with the bottom of the kettle. This bottom B being placed over the hole of a stove, with a kettle or spider resting upon the elevations $a$, the smoke, &c., passes beneath the kettle or spider between these elevations into the stove, being prevented from escaping into the room by means of the cover A A, which entirely covers the kettle or spider, its lower edges resting upon the bottom B, as represented in Fig. 1.

The object of this bottom B is to protect the top of the stove from the offensive spatters of grease, &c., from the food while cooking, and from the drippings of condensed steam, and also to prevent a draft of air up under the cover where it extends out over the edge of the stove, as it must necessarily do in order to cover the kettles and spiders in ordinary use. This upward draft, unless prevented, causes the steam and odor to escape into the room; but by using this bottom B the cover can be made as large as necessary, and the door D can be left open when frying, as hereinafter specified, without permitting any smoke or odor to escape, there being no counter-draft.

When used with a spider, an aperture in the side of the cover A is necessary for the handle thereof to protrude through, and also as a space through which to attend to the food therein. When used with a kettle, where a great deal of steam is arising, a door, D, can be used to close this aperture.

It is also convenient to have a small aperture in the top of the cover A, through which the food can be attended to in the kettle when being cooked without removing the cover A, this aperture having a close-fitting cover, $d$, which it is desirable to have transparent.

In a cover, A, of this class, to be used with the bottom B, the apertures in the top and side could, of course, be omitted altogether, or constructed and arranged in any other desirable manner.

The bottom B has an outer rim, E, an eighth of an inch or more high, and a similar rim, F, around the hole C, to prevent the grease which spatters onto the bottom B, or the condensed steam from the kettle, from running off onto the stove or dripping on the floor.

I claim as my invention—

1. The combination, with a spider and kettle cover of the class described, of a bottom, B, constructed substantially as described, and for the purposes set forth.

2. In a cooking apparatus, the combination of the bottom B with the cover A, having door D and transparent top $d$, substantially as described.

DEXTER M. SMALL.

Witnesses:
GEO. H. REMINGTON,
J. H. PERKINS.